Feb. 8, 1966  B. C. HAMLET  3,233,915
CARRIAGE WITH COMPOUND SPRING SUSPENSION ASSEMBLY
Filed June 8, 1964
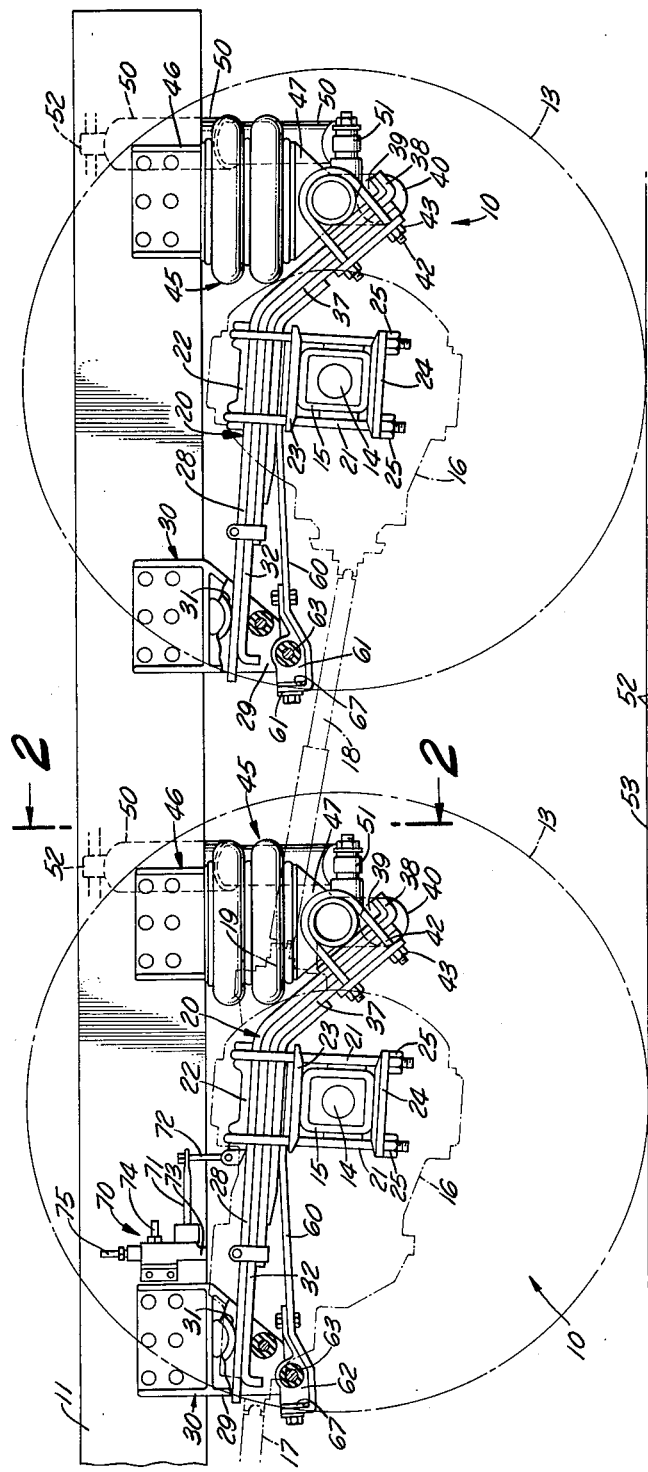
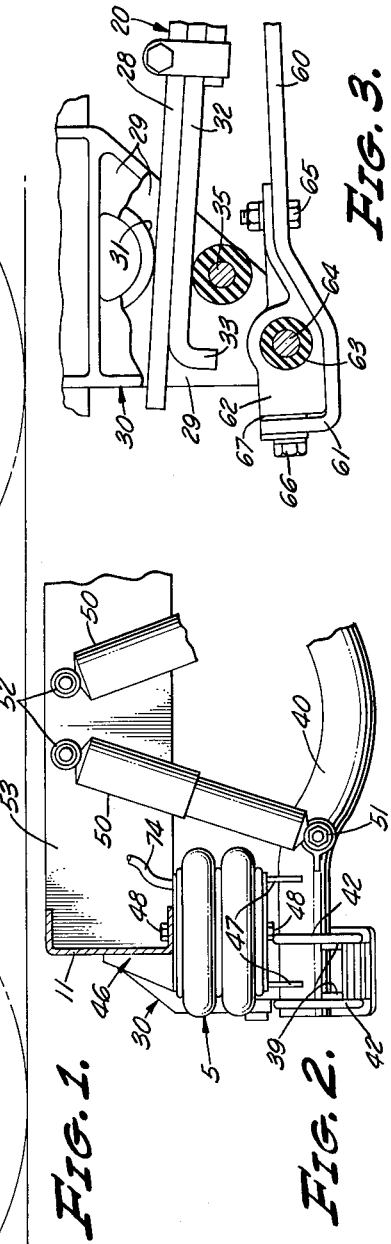
INVENTOR.
BUCK C. HAMLET
BY
ATTORNEY 3,233,915
CARRIAGE WITH COMPOUND SPRING
SUSPENSION ASSEMBLY
Buck C. Hamlet, La Habra, Calif., assignor to Western Unit Corporation, City of Industry, Calif., a corporation of California
Filed June 8, 1964, Ser. No. 373,224
12 Claims. (Cl. 280—124)

This invention relates to spring suspension assemblies for vehicles and more particularly to an improved low height spring suspension unit of unusual versatility, flexibility and the capability of providing a soft ride for widely varying cargo weights.

Cargo vehicles present vexatious suspension problems both as respects provision for resiliently suspending widely varying cargo weight but also the cargo bed itself when empty. The problems are particularly serious and difficult to resolve if added to the foregoing considerations there is a requirement for resiliently supporting the cargo bed at minimum height above the roadway while providing maximum road clearance.

A variety of approaches and proposals have been made for resolving these rigid requirements including various spring arrangements suspended from the lower side of the carriage axle. However these offer serious objections because of the low clearance between components of the spring units and the roadway and the likelihood of damage resulting from contact with rough roads and obstacles in the path of travel.

If on the other hand the spring components are supported above the carriage axle an objectionably great amount of vertical spacing has invariably been required to accommodate the essential components. And this spacing has been further increased if an attempt is made to use a spring beam in combination with air bellows to provide a wider range softer ride. In all of these arrangements the cargo bed of necessity is located at an objectionable height above the roadway.

The present invention provides a unique solution for the aforementioned and other problems by resort to a compound spring suspension system utilizing the many advantages of a spring beam in combination with a regulatable air spring bellows while at the same time lowering the cargo bed to a position closer to the upper side of the carriage axle. Spring beams have many desirable characteristics including in particular the ease and economy with which they can be constructed to support any desired load and contoured to any desired shape, these being assembled from multiple layers of highly tempered spring leaves. According to the present invention the spring beam is contoured to have an inverted V-shape with its two legs of quite different lengths and flexibility. The longer flexible leg is arranged to be supported generally horizontally closely parallel to the other side of the vehicle frame with the ends of its several leaves arranged in echelon to provide the desired resiliency. The other shorter and relatively stiff, inflexible leg is arranged at an acute angle to the horizontal and extends downwardly and rearwardly from the axle. All leaves of this latter leg are substantially of the same length to provide a high-strength relatively nonflexible spring leg.

Another feature of the suspension assembly is that neither end of the compound spring is rigidly secured to the vehicle frame, the forward end of the flexible leg being in loose fitting frictional contact with the underside of the spring hanger, the relatively rigid leg being connected to the vehicle frame through a flexible air bellows. The major portion of this bellows is located below the level of contact of the forward spring leaf with the vehicle body. By reason of this last-mentioned arrangement, a very substantial saving is achieved in vertical spacing without material sacrifice in the height of the air bellows spring.

Draft requirements and flexible stabilizing effectiveness is provided by spring leaf draft members having their rear ends rigidly connected to the carriage axle and their forward ends resiliently and flexibly coupled to the forward spring hangers. Additional and highly desirable and effective stabilizing influence is provided by a rigid brace member rigidly interconnecting the lower rear ends of the spring beams supplemented by a pair of heavy duty upwardly converging shock absorbers. The latter have their upper ends movably connected to the vehicle frame near its longitudinal center line and their widely spaced lower ends similarly connected to the ends of the brace member. These shock absorbers, acting in concert with the spring leaf radius members and the spring beams, provide high flexibility wide range torsion resistance holding the carriage assembly flexibly centered longitudinally of the vehicle frame.

A soft ride for the empty vehicle as well as when carrying either light or heavy loads is assured by the use of automatic leveling valve means responsive to the deflection of the flexible ends of the spring beams to regulate the air pressure within the respective air bellows. It will therefore be recognized that the air bellows may be utilized in combination with the resilient spring beam to provide a soft ride at all times. Moreover and of particular importance this most important result is achieved by a spring suspension characterized by its unusually low over-all height together with maximum road clearance.

Accordingly it is a primary object of the present invention to provide an improved highly flexible and versatile spring suspension assembly for cargo vehicles featuring minimum over-all height and maximum road clearance.

Another object of the invention is the provision of a vehicle suspension assembly featuring a compound spring arranged in an unusually compact manner between the upper side of the carriage axle and the underside of a lowered vehicle frame.

Another object of the invention is the provision of a highly flexible spring suspension assembly capable of providing a soft ride for either empty or loaded vehicles and utilizing a specially constructed spring beam in combination with a regulatable air bellows.

Another object of the invention is the provision of a unique spring suspension carriage assembly for cargo vehicles suitable for use singly or in tandem and featuring an inverted V-shaped spring having a flexible end, and a relatively rigid nonflexible end providing a support for a vertically disposed air spring bellows.

Another object of the invention is the provision of a compound spring suspension assembly for a cargo vehicle having a relatively rigid end bent downwardly and connected to the vehicle body through an overlying spring bellows and its other end extending forwardly and being relatively flexible and loosely coupled to the vehicle by means including a spring radius leaf draft member.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary side elevational view partly in section, showing a preferred embodiment of the invention with a pair of spring suspension assemblies arranged in tandem;

FIGURE 2 is a fragmentary sectional view taken transversely of the vehicle frame along line 2—2 on FIGURE 1; and FIGURE 3 is a fragmentary side view partly in section through one of the forward hanger brackets and the associated components.

Referring to FIGURES 1 to 3 there is shown an illustrative embodiment of the invention designated generally 10 and comprising a pair of identical spring suspension assemblies supporting the rear end of a heavy duty vehicle frame 11. This frame may be constructed of structural steel members in any well known manner and includes suitable cross members and bracing well known to those familiar with this art.

Each of the spring suspension units 10 includes a carriage having tired wheels 13 fixedly mounted on the outer ends of drive axle 14 supported within an axle housing 15 and having their inner ends drivingly coupled to differential gearing enclosed within housing 16. The forward differential is driven from the vehicle engine by means of drive shaft 17 whereas the second differential is driven by a telescoping drive shaft 18 having its forward end coupled to a power takeoff 19 of the forward differential unit. The constructional details of the differential gearing and drive shafts are not shown since these are well known and form no part of the present invention.

The compound spring suspension fixed to the opposite ends of each axle housing includes an inverted V-shaped multiple leaf spring beam 20 rigidly clamped across the top of the axle housing by U-bolts 21. This spring clamping means includes an upper pressure plate 22, a spring seat plate 23, a lower pressure or clamping plate 24 held assembled by clamping nuts 25 and bolts 21.

The longer forwardly projecting leg 28 of the spring beam extends between the legs 29 of a hanger bracket 30 riveted, welded or otherwise securely fixed to the sides of vehicle frame 11, the longer top leaf bearing against a rounded pillow or bearing boss 31 in the manner best shown in FIGURE 3. An intermediate leaf 32 has a downturned end 33 engageable under extreme conditions with the rubber covered bolt 35 supported between the hanger bracket legs 29 and safeguarding against accidental disassembly of the spring beam from the hanger. The rubber covering for bolt 35 provides a resilient buffer for the spring and aids in holding the spring beam against bearing surface 31.

The rear end of spring beam 20 comprises a relatively short leg 37 which is relatively stiff and nonflexible compared with the resilient forwardly projecting leg 28. The ends of the upper leaves of leg 37 are turned upwardly as indicated at 38 to provide a positive retainer and seat for casting 39 welded or otherwise secured to the end of cross brace tube 40 held seated along with brace 40 against the upper side of spring leg 37 by U-bolts 42 and clamping nuts 43.

A resilient connection between the vehicle frame 11 and the rear end of spring beam 20 comprises an air spring bellows 45 having its upper end rigidly connected to a hanger bracket 46 and its lower end coupled to cross brace 40 as by brackets 47 welded to brace 40. The rubber bellows itself may be detachably secured to brackets 47 and frame 11 by cap screws 48 (FIGURE 2).

Of very considerable importance in providing stabilizing and torsion resisting action for the described spring suspension assembly are a pair of upwardly converging heavy duty shock absorbers 50, 50 best shown in FIGURE 2. The widely-spaced lower ends of these are resiliently connected to cross brace 40 by rubber cushioned coupling means 51 and the closely-spaced upper ends are similarly connected by resilient couplings 52 to cross brace 53 of frame 11 closely adjacent its longitudinal center. It is therefore apparent that these shock absorbers are so disposed as to be highly effective in stabilizing the carriage and the spring suspension means.

Further augmenting the shock absorber and cross brace in stabilizing the suspension units is the flexible radius leaf 60 underlying each leg 28 of the spring beams. These radius leaves 60 have their rear ends rigidly clamped between the spring beam and the axle housing. Their forward ends are of L-shape and include a generally vertical leg 61 best shown in FIGURE 3. Seated in this L-shaped recess is a casting 62 having a transverse bore provided with a rubber bushing 63 and an assembly bolt 64 having its end supported in legs 29 of hanger bracket 30. The slotted forward end of casting 62 is held assembled to radius leaf 60 by bolt 65 whereas the slotted upturned leg 61 is held assembled to the casting by cap screw 66. Interposed between leg 61 and the end wall of casting 62 is a shim pack 67 the thickness of which may be adjusted as found suitable and necessary to align carriage axle 14 to lie normal to longitudinal axis of vehicle frame 11. In this connection it is pointed out that the shims compensate for manufacturing tolerances between the components and enable the carriage axles to be adjusted until perpendicular to the longitudinal center line of the vehicle.

It will be understood that the described spring suspension includes a suitable automatic self-leveling control designated generally 70 and rigidly supported, as on the vehicle frame. A particularly suitable leveling valve is that disclosed in Harbers et al. Patent 3,063,732, granted November 13, 1962. Operating lever 71 of this valve projects from this main housing and is connected by link 72 with pressure plate 22 holding the spring beam coupled to the axle housing. Accordingly linkage 71 and 72 cooperating in sensing flexing of spring leg 28 and operates a servo valve either to vent air to the atmosphere through outlet end 73 or to admit pressurized air to spring bellows through line 74 from pressurized supply line 75 depending upon whether less or greater support is required of bellows 45. Air is admitted to or vented from bellows 45 through passage 74 as is necessary to maintain the operating links 71, 72 in a neutral position wherein a given air pressure is maintained in the bellows. It will be appreciated that each of the spring suspension assemblies may be provided with its own self-leveling valve mechanism 70 or that a single leveling control may service the air bellows of both spring suspension assemblies.

When the vehicle is operating unloaded it will be understood the resilient forward leg of the spring beam, acting in cooperation with minimum air pressure in the air bellows, provides a soft ride. At higher loading the valve acts to admit more air to the bellows to continue providing a soft ride for the greater load and the same is true as the load is further increased with the spring beam and the bellows mutually assisting one another in carrying the applied load. It is also pointed out that the relatively rigid trailing ends of the spring beam are highly effective in counteracting brake torque, maintaining alignment of the carriage with the vehicle and in providing sway control.

While the particular carriage with compound spring suspension assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A vehicle suspension assembly providing substantially lower cargo bed height without reducing road clearance, said assembly comprising a carriage having axle means and supporting wheels adapted to be located exteriorly of and along the opposite sides of a rigid vehicle frame, separate spring beams rigidly clamped crosswise of the opposite ends of said carriage axle means adjacent the inner faces of the carriage wheels, said spring beams comprising superimposed spring leaves with a first relatively flexible end lying generally horizontally and a second relatively nonflexible end inclined downwardly at an acute angle to the horizontal, means including a pair of brackets attached to said vehicle frame providing a lost motion connection between the first ends of said spring beams and said vehicle frame, means providing a flexible draft connection between said brackets and the opposite ends of said carriage axle means, stabilizing means including said axle means interconnecting the second ends of said spring beams transversely of the vehicle, a pair of air bellows springs interposed between said second spring ends and the overlying portion of the vehicle frame, and self-leveling valve means for controlling the air pressure in said air bellows in accordance with load conditions imposed on said suspension assembly.

2. A low-height compound spring suspension assembly for vehicles capable of supporting a cargo bed closely spaced above the carriage axle while maintaining maximum road clearance and providing a resilient suspension for a wide range of cargo weights, said suspension assembly comprising a carriage axle assembly, a vehicle frame positioned between the carriage wheels and closely spaced above the carriage axle, a multiple leaf spring beam extending across the top of the axle near each wheel and having its midportion rigidly secured to the axle, hanger means secured to said frame forwardly of said axle and loosely straddling the forward relatively flexible end of said beam and including draft connection means between said hanger means and the opposite ends of said axle, the rear ends of said spring beams being bent downwardly and rearwardly from the connection thereof to said axle and being relatively rigid and nonflexible, stabilizing means interconnecting said spring beams and including a pair of stabilizing shock absorber means having their widely-spaced lower ends pivotally connected to the rear ends of said spring beams and their closely-spaced upper ends pivotally connected to said vehicle frame and cooperating therewith in holding said carriage generally but flexibly centered relative to the frame, a pair of air bellows connected between said frame and the lower rear ends of said spring beams, and means for automatically regulating the air pressure in said bellows in response to variations in cargo weight.

3. The combination defined in claim 2 characterized in the provision of a pair of said compound spring suspension and carriage assemblies in closely spaced tandem relation near the rear end of said vehicle frame, said pair of suspension assemblies being independent of one another and each including pressurized air connections between their air bellows, said air pressure regulating means and a source of pressurized air.

4. A spring suspension assembly as defined in claim 2 characterized in that said spring beams are rigidly secured to the upper side of said carriage axles.

5. A spring suspension assembly as defined in claim 4 characterized in that a horizontal plane passing through the contact area of the flexible forward end of said spring and said hanger means intersects said air bellows generally centrally between the opposite ends thereof.

6. A low-height compound spring suspension assembly for vehicles capable of supporting a cargo bed closely spaced above the carriage axle while maintaining maximum road clearance and providing a resilient suspension for a wide range of cargo weights, said suspension assembly comprising a carriage axle assembly, a vehicle fame positioned between the carriage wheels and closely spaced above the carriage axle, an inverted V-shaped spring beam extending crosswise of the opposite ends of said carriage axle and rigidly secured to the upper side thereof adjacent the apex of said V, said spring beams including a relatively flexible forwardly projecting leg lying generally horizontally and a downwardly and rearwardly projecting nonflexible leg, bracket means loosely coupling the free end of said flexible leg to the vehicle frame, spring radius leaf means underlying said flexible leg with its forward end movably connected to said bracket and its rear end connected to said carriage axle, said connection between said hanger means and said radius leaf including a shim pack to compensate for variations in manufacturing tolerances, a variable capacity air spring bellows means interposed between the lower rear ends of said V-shaped spring beams and the overlying portion of said vehicle frame with the lower end of the air bellows being positioned below the upper side of the spring beam at its point of connection with the carriage axle, and means for regulating the air pressure within said air spring belloys in accordance with the deflection of the flexible end of said spring beam.

7. A compound spring suspension assembly as defined in claim 6 characterized in that said forward end of said radius leaf means is L-shaped with one leg extending generally vertically, a casting seated in said L-shaped end and having a resilient pivotal connection with said bracket, said compensating shim pack being sandwiched between said vertical leg and the juxtaposed surface of said casting, and means holding said L-shaped end and said casting and said shim pack assembled.

8. In combination, a carriage axle, a pair of inverted generally V-shaped spring beams extending transversely of said axle and portions and rigidly secured thereto adjacent the apex of said beams, said beams having a relatively flexible forwardly projecting end disposed generally parallel to and closely beneath the lower edge of a vehicle frame and a relatively nonflexible end projecting rearwardly and downwardly from said axle, hanger means resting loosely against the upper forward end of said flexible spring end, draft means extending along said flexible end and movably interconnecting said hanger means and said carriage axle, an air spring bellows positioned partially above and partially below the plane of contact between said hanger means and the flexible forward portion of said spring beam, means securing the opposite ends of said bellows respectively to said vehicle frame and to the rear lower end of said spring beam, and means for regulating the air pressure in said bellows to cooperate with the forward flexible portion of said spring beams in sharing a proportionate amount of the load.

9. The combination defined in claim 8 characterized in the provision of a rigid cross brace interconnecting the lower rear ends of said spring beams and lying in the same general horizontal plane as said axle.

10. The combination defined in claim 8 characterized in the provision of stabilizer means flexibly interconnecting said vehicle frame and the lower rear ends of said spring beams including a pair of upwardly converging shock absorbers having their upper ends movably connected to the vehicle frame near the longitudinal center line thereof.

11. The combination defined in claim 10 characterized in that the rearwardly projecting ends of said spring beams are relatively shorter than said flexible ends and relatively stiff and nonflexible.

12. The combination defined in claim 11 characterized in that the lower rear ends of said spring beams are bent to form a positive retainer seat for the lower end of said air bellows.

References Cited by the Examiner

UNITED STATES PATENTS

| | | | |
|---|---|---|---|
| 2,222,377 | 11/1940 | Slack | 280—124 X |
| 2,632,639 | 3/1953 | Proske | 267—28 |
| 2,717,787 | 9/1955 | Ward | 267—56 X |
| 2,777,686 | 1/1957 | Giascosa | 280—124 X |
| 2,785,888 | 3/1957 | Bennett | 280—104.5 X |
| 2,861,797 | 11/1958 | Norrie | 267—56 X |
| 3,063,732 | 11/1962 | Harbers | 267—32 X |

FOREIGN PATENTS 96,115    9/1922    Switzerland.

BENJAMIN HERSH, *Primary Examiner.*